(12) United States Patent
Horowitz et al.

(10) Patent No.: US 11,544,732 B2
(45) Date of Patent: Jan. 3, 2023

(54) IDENTIFIER-BASED COUPON DISTRIBUTION

(71) Applicant: Quotient Technology Inc., Mountain View, CA (US)

(72) Inventors: Steven M. Horowitz, Los Altos, CA (US); Jason Boehle, Lawrence, KS (US); Bipin Pattan, Fremont, CA (US)

(73) Assignee: QUOTIENT TECHNOLOGY INC., Salt Lake City, UT (US)

( * ) Notice: Subject to any disclaimer, the term of this patent is extended or adjusted under 35 U.S.C. 154(b) by 0 days.

(21) Appl. No.: 16/858,470

(22) Filed: Apr. 24, 2020

(65) Prior Publication Data

US 2020/0258112 A1    Aug. 13, 2020

Related U.S. Application Data

(63) Continuation of application No. 16/217,862, filed on Dec. 12, 2018, now Pat. No. 10,636,049, which is a
(Continued)

(51) Int. Cl.
*G06Q 30/02* (2012.01)
*H04M 3/42* (2006.01)
(Continued)

(52) U.S. Cl.
CPC ....... *G06Q 30/0231* (2013.01); *G06K 7/1417* (2013.01); *G06Q 20/3276* (2013.01);
(Continued)

(58) Field of Classification Search
CPC .......... G06Q 30/0224; G06Q 30/0208; G06Q 30/0236; G06Q 30/0207
See application file for complete search history.

(56) References Cited

U.S. PATENT DOCUMENTS

| | | | |
|---|---|---|---|
| 4,745,468 A | 5/1988 | Von Kohorn |
| 4,876,592 A | 10/1989 | Von Kohrn |
| 4,926,255 A | 5/1990 | Von Kohrn |
| 5,034,807 A | 7/1991 | Von Kohrn |
| 5,057,915 A | 10/1991 | Von Kohrn |

(Continued)

FOREIGN PATENT DOCUMENTS

AU    2006/294868    6/2011

OTHER PUBLICATIONS

Galen R. Collins, Usable Mobile Ambient Intelligent Solutions for Hospitality Customers, Journal of Information Technology Impact, vol. 10, No. 1, pp. 45-55 (Year: 2010).*

(Continued)

*Primary Examiner* — E Carvalho
(74) *Attorney, Agent, or Firm* — Baker Botts L.L.P.

(57) ABSTRACT

A client device detects a QR code (or NFC tag). The client device decodes the QR code. The client device determines that the data encoded within the QR code includes a URL. Based on the URL, the client device sends a first request to a first server identified by the URL. In response to the first request, the client device receives from the first server data configured to cause the client device to display, to a user of the client device, at least one of: a video or an interactive web page. Responsive to the data encoded in the QR code, the client device sends to a coupon server: identification data associated with a user of the client device, and a request for the coupon server to distribute a digital coupon for an offer associated with an identifier encoded within the QR code to an account associated with the user.

10 Claims, 5 Drawing Sheets

Related U.S. Application Data continuation of application No. 15/904,060, filed on Feb. 23, 2018, now Pat. No. 10,163,124, which is a continuation of application No. 15/644,460, filed on Jul. 7, 2017, now Pat. No. 9,940,638, which is a continuation of application No. 15/400,849, filed on Jan. 6, 2017, now Pat. No. 9,727,889, which is a continuation of application No. 14/639,732, filed on Mar. 5, 2015, now Pat. No. 9,619,818, which is a continuation of application No. 13/396,553, filed on Feb. 14, 2012, now Pat. No. 9,002,727.

(60) Provisional application No. 61/442,745, filed on Feb. 14, 2011.

(51) Int. Cl.

| | | |
|---|---|---|
| *H04M 3/487* | (2006.01) | |
| *H04W 4/21* | (2018.01) | |
| *H04W 4/80* | (2018.01) | |
| *G06Q 20/32* | (2012.01) | |
| *H04L 67/02* | (2022.01) | |
| *G06K 7/14* | (2006.01) | |
| *G06Q 30/06* | (2012.01) | |
| *G06F 16/00* | (2019.01) | |
| *H04W 4/029* | (2018.01) | |
| *H04L 67/01* | (2022.01) | |
| *H04L 67/50* | (2022.01) | |
| *G06F 16/955* | (2019.01) | |

(52) U.S. Cl.
CPC ..... *G06Q 30/0207* (2013.01); *G06Q 30/0208* (2013.01); *G06Q 30/0214* (2013.01); *G06Q 30/0224* (2013.01); *G06Q 30/0225* (2013.01); *G06Q 30/0233* (2013.01); *G06Q 30/0236* (2013.01); *G06Q 30/0239* (2013.01); *G06Q 30/0633* (2013.01); *H04L 67/02* (2013.01); *H04M 3/42* (2013.01); *H04M 3/4878* (2013.01); *H04W 4/21* (2018.02); *H04W 4/80* (2018.02); *G06F 16/00* (2019.01); *G06F 16/9566* (2019.01); *H04L 67/01* (2022.05); *H04L 67/535* (2022.05); *H04W 4/029* (2018.02)

(56) References Cited

U.S. PATENT DOCUMENTS

| | | | |
|---|---|---|---|
| 5,128,752 | A | 7/1992 | Von Kohrn |
| 5,227,874 | A | 7/1993 | Von Kohrn |
| 5,249,044 | A | 9/1993 | Von Kohrn |
| 5,283,734 | A | 2/1994 | Von Kohrn |
| 5,368,129 | A | 11/1994 | Von Kohrn |
| 5,508,731 | A | 4/1996 | Von Kohrn |
| 5,697,844 | A | 12/1997 | Von Kohrn |
| 5,713,795 | A | 2/1998 | Von Kohrn |
| 5,759,101 | A | 6/1998 | Von Kohrn |
| 5,761,648 | A | 6/1998 | Golden et al. |
| 5,791,991 | A | 8/1998 | Small |
| 5,907,830 | A | 5/1999 | Engel et al. |
| 5,916,024 | A | 6/1999 | Von Kohrn |
| 6,321,208 | B1 | 11/2001 | Barnett |
| 6,336,099 | B1 | 1/2002 | Barnett et al. |
| 7,308,254 | B1 | 12/2007 | Rissanen |
| 7,640,240 | B2 | 12/2009 | Boal et al. |
| 7,734,621 | B2 | 6/2010 | Weitman et al. |
| 7,784,702 | B2 | 8/2010 | Michels |
| 7,870,025 | B2 | 1/2011 | English |
| 7,962,931 | B2 | 6/2011 | Bova |
| 8,000,496 | B2 | 8/2011 | Keswani et al. |
| 8,055,642 | B2 | 11/2011 | Boal et al. |
| 8,165,078 | B2 | 4/2012 | Walsh et al. |
| 8,559,455 | B1 * | 10/2013 | Yuan ............... H04W 28/20 370/444 |
| 10,255,614 | B2 * | 4/2019 | Roeding ........... G06Q 30/0238 |
| 2002/0052782 | A1 | 5/2002 | Landesmann |
| 2002/0198775 | A1 | 12/2002 | Ryan |
| 2003/0018489 | A1 | 1/2003 | Newby |
| 2003/0055723 | A1 | 3/2003 | English |
| 2004/0054574 | A1 | 3/2004 | Kaufman |
| 2004/0083131 | A1 | 4/2004 | Kaufman |
| 2005/0010472 | A1 | 1/2005 | Quatse |
| 2005/0060232 | A1 | 3/2005 | Maggio |
| 2006/0143072 | A1 | 6/2006 | Herman |
| 2006/0201775 | A1 | 9/2006 | Tedesco |
| 2007/0084917 | A1 | 4/2007 | Fajkowski |
| 2008/0248815 | A1 | 10/2008 | Busch |
| 2008/0262910 | A1 | 10/2008 | Altberg |
| 2008/0290987 | A1 | 11/2008 | Li |
| 2008/0313122 | A1 | 12/2008 | Otto |
| 2009/0070216 | A1 | 3/2009 | Silvera |
| 2009/0074187 | A1 * | 3/2009 | Inoue ............... H04L 29/12264 380/270 |
| 2009/0125396 | A1 | 5/2009 | Otto |
| 2009/0147778 | A1 | 6/2009 | Wanless |
| 2009/0150211 | A1 | 6/2009 | Bayne |
| 2009/0254971 | A1 | 10/2009 | Herz |
| 2009/0276307 | A1 | 11/2009 | Griffith |
| 2009/0299847 | A1 | 12/2009 | Keeter |
| 2010/0094759 | A1 | 4/2010 | Kanno |
| 2010/0120398 | A1 * | 5/2010 | Chang ............... H04W 48/08 455/411 |
| 2010/0138297 | A1 | 6/2010 | Fitzgerald |
| 2010/0138298 | A1 | 6/2010 | Fitzgerald |
| 2010/0211450 | A1 | 8/2010 | Landesmann |
| 2010/0293250 | A1 * | 11/2010 | Ankaiah ............ H04L 63/101 709/219 |
| 2010/0318407 | A1 | 12/2010 | Leff |
| 2011/0015984 | A1 | 1/2011 | Galinos |
| 2011/0035287 | A1 | 2/2011 | Fox |
| 2011/0087529 | A1 | 4/2011 | Angell |
| 2011/0302011 | A1 | 12/2011 | Yoder |
| 2012/0022956 | A1 | 1/2012 | Payne et al. |
| 2012/0078697 | A1 | 3/2012 | Carlson |
| 2012/0078699 | A1 | 3/2012 | Carlson |
| 2012/0084122 | A1 | 4/2012 | Boehle |
| 2012/0088476 | A1 * | 4/2012 | Greenfield ......... H04W 4/50 455/414.1 |
| 2012/0095819 | A1 | 4/2012 | Li |
| 2012/0116840 | A1 | 5/2012 | Omer |
| 2012/0150619 | A1 | 6/2012 | Jacob |
| 2012/0190386 | A1 | 7/2012 | Anderson |
| 2012/0201201 | A1 * | 8/2012 | Liu .................. H04W 8/18 370/328 |
| 2012/0303446 | A1 | 11/2012 | Busch |
| 2013/0085835 | A1 * | 4/2013 | Horowitz ........... G06Q 30/0207 705/14.38 |
| 2013/0097006 | A1 | 4/2013 | Evans |
| 2013/0097080 | A1 | 4/2013 | Smets |
| 2013/0128755 | A1 * | 5/2013 | Ullah ............... H04W 48/16 370/252 |
| 2014/0033288 | A1 * | 1/2014 | Wynn ............... H04L 67/141 726/7 |
| 2017/0116636 | A1 | 4/2017 | Horowitz et al. |
| 2017/0308921 | A1 | 10/2017 | Horowitz |
| 2018/0181983 | A1 | 6/2018 | Horowitz |
| 2019/0139073 | A1 | 5/2019 | Horowitz |

OTHER PUBLICATIONS

EP Communication from EPO for EP Patent Application No. 18898765.5-1213, dated Oct. 8, 2020.
Venkatesh et al., "Mobile Marketing: A Synthesis an Prognosis", Journal of Interactice Marketing, vol. 23, Issue 2, dated May 2009, pp. 118-129.
Shankar, Venkatesh, et al., "Mobile Marketing in the Retailing Environment: Current Insights and Future Research Avenues", Journal of Interactive Marketing 24.2 dated 2010: 111-120.

(56) References Cited

OTHER PUBLICATIONS

Ricknas, M. "Visa Makes NFC Payment Commercially Available" downloaded from the Internet, http://www.pcworld.com/article/162850/visa_makes_nfc_payment_commercially_available.html dated Apr. 9, 2009, 3 pgs.

Ondrus et al., "An Architecture for Mobile Payments and Couponing in Retail Indusrty", 17th Bled eCommerce Conference Global, 2004.

Newcomb, US App No. "Mobile Computing in the Retail Arena", Proceedings of the SIGCHI Conference on Human Factors in Computing Systems, ACM, 2003.

Newcomb et al., "Mobile Computing in the Retail Arena", Proceedings of the SIGCHI Conference on Human Factors in Computing Systems, ACM dated 2003.

Li et al., "Mobile in Store Personalized Services", Web Services, dated 2009, ICWS 2009, IEEE.

Kadambi et al., "Near-filed Communication-Based Secure Mobile Payment Service", Procedings of the 11th International Conference on Electronic Commerce, ACM, 2009.

Grewal, Dhruv, et al., "Innovations in Retail Pricing and Promotions", Journal of Retailing 87, dated 2011, S43-S52.

European Patent Office, "Search Report" in application No. 12155425.7-1870, dated May 21, 2014, 8 pages.

Claims in European Application No. 12155425.7-1870, dated May 2014, 6 pages.

"7 things you should know about . . . QR Codes" downloaded from the Internet. http://net.educause.edu/ir/library/pdf/ELI7046.pdf dated Feb. 2009 (2 pages).

Horowitz, U.S. Appl. No. 16/217,862, filed Dec. 12, 2018, Office Action, dated Sep. 20, 2019.

Horowitz, U.S. Appl. No. 16/217,862, filed Dec. 12, 2018, Notice of Allowance, dated Jan. 13, 2020.

Horowitz, U.S. Appl. No. 15/904,060, filed Feb. 23, 2018, Office Action, dated Apr. 4, 2018.

Horowitz, U.S. Appl. No. 15/904,060, filed Feb. 23, 2018, Notice of Allowance, dated Oct. 26, 2018.

Horowitz, U.S. Appl. No. 15/644,460, filed Jul. 7, 2017, Office Action, dated Aug. 21, 2017.

Horowitz, U.S. Appl. No. 15/644,460, filed Jul. 7, 2017, Notice of Allowance, dated Jan. 24, 2018.

Horowitz, U.S. Appl. No. 15/400,849, filed Jan. 6, 2017, Notice of Allowance dated Apr. 21, 2017.

* cited by examiner

IDENTIFIER-BASED COUPON DISTRIBUTION

CROSS-REFERENCE TO RELATED APPLICATIONS; BENEFIT CLAIM

This this application claims the benefit as a continuation of U.S. patent application Ser. No. 16/217,862, filed Dec. 12, 2018, which is a continuation of U.S. patent application Ser. No. 15/904,060, filed Feb. 23, 2018, now U.S. Pat. No. 10,163,124, which is a continuation of U.S. patent application Ser. No. 15/644,460, filed Jul. 7, 2017, now U.S. Pat. No. 9,940,638, which is a continuation of U.S. patent application Ser. No. 15/400,849, filed Jan. 6, 2017, now U.S. Pat. No. 9,727,889, which is a continuation of U.S. patent application Ser. No. 14/639,732, filed Mar. 5, 2015, now U.S. Pat. No. 9,619,818, which is a continuation of U.S. patent application Ser. No. 13/396,553, filed Feb. 14, 2012, now U.S. Pat. No. 9,002,727, that claims benefit of U.S. Provisional Patent Application No. 61/442,745, filed Feb. 14, 2011.

TECHNICAL FIELD

The present disclosure relates to coupon distribution in response to a device detecting identifiers based on data sensed by one or more sensors on or at the device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In general, a coupon is a certificate that entitles its holder to accept an offer described or referenced by the coupon. The offer, also subsequently referred to as the "coupon offer," may be any type of offer, but is in general an offer by the coupon provider to provide a customer with one or more goods or services at a typically discounted price, or to provide the customer with a gift in exchange for the performance of an act, such as purchasing a good or service. A coupon often takes a "hard copy" form, such as a paper certificate, printed on which are images and/or text describing terms of the offer. The process of the user accepting a coupon offer by presenting, referencing, or otherwise providing a coupon while purchasing, contracting, or otherwise transacting with another party shall hereinafter be referred to as "redeeming" the coupon. For example, a customer may redeem a hard copy of a coupon by handing the copy to a clerk during a purchase at a retail store.

While coupons have conventionally been distributed to customers by hand, such as via mail or newspapers, recent distribution techniques now provide customers with opportunities to print their own coupons. For example, a number of websites provide search engines or browsable catalogs with which users may locate offers and then print coupons for the offers they find. Some of these websites may employ mechanisms to control the number of times that a given offer may be printed by a customer, by a device, and/or in aggregate. The printed coupons may be used in the same manner as any other coupon.

Other recent distribution techniques involve creating unique digital coupons. One such technique involves creating unique digital coupons that may be saved to an account associated with the user, such as a store loyalty account. The user may redeem such digital coupons during online or physical transactions by presenting an account identifier, such as a store loyalty card or an oral identification of the user's telephone number, for the associated account. Another such technique involves creating unique digital coupons that may be stored on a computing device. The digital coupons may be transmitted from the computing device to a point-of-sale during a transaction using any of a variety of mechanisms. For example, information about the digital coupon may be uploaded to the point-of-sale during an online transaction involving the computing device. As another example, information about the digital coupon may be transmitted wirelessly from a smartphone to a receiving component coupled to a checkout register during a transaction at a brick-and-mortar store.

DETAILED DESCRIPTION

Figure 1:
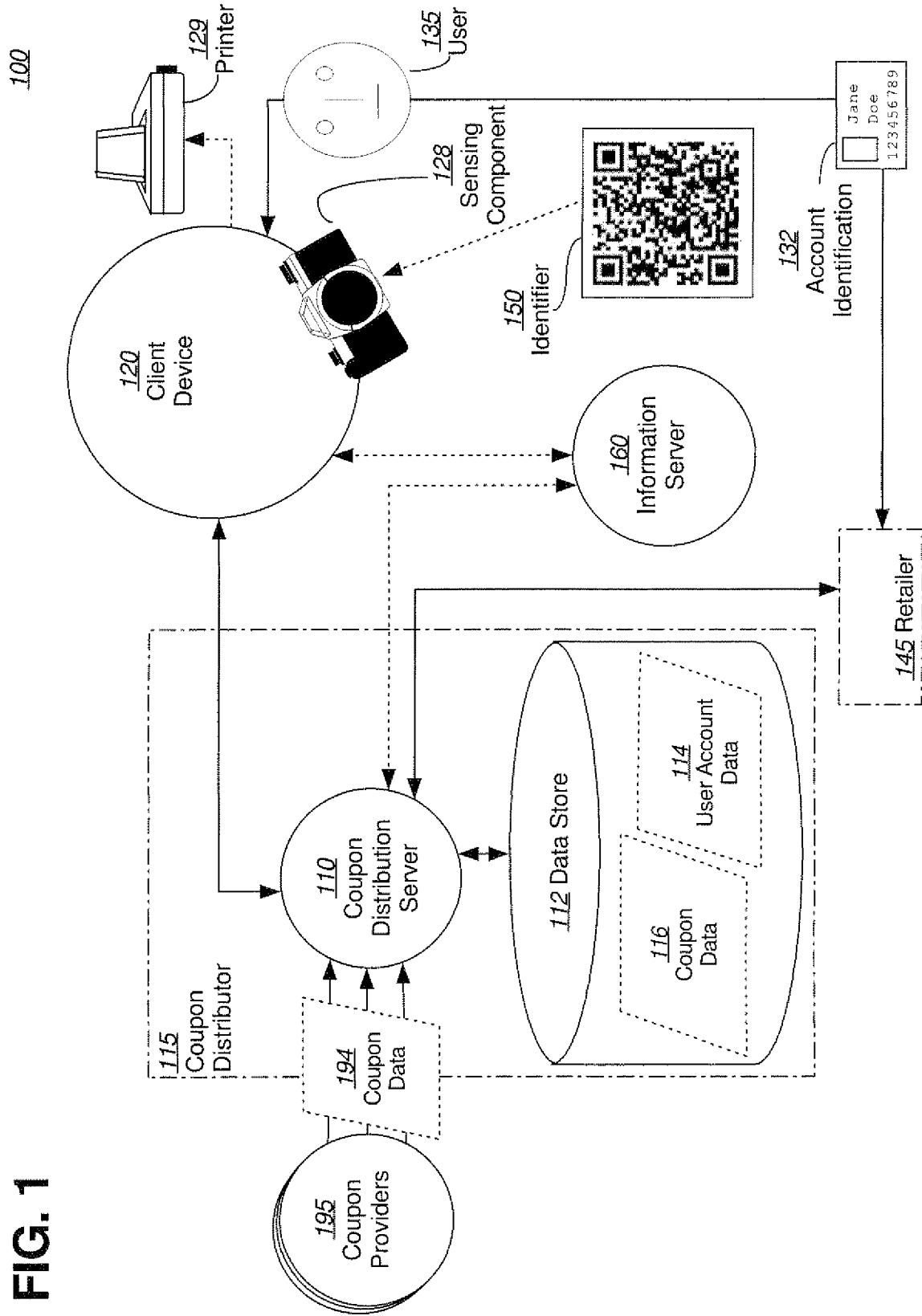
FIG. 1 is a block diagram of an example system for distributing coupons.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. GENERAL OVERVIEW
2.0. FUNCTIONAL OVERVIEW
  2.1. Distribution by Scanning a QR Code
  2.2. Distribution using Coupon Management Application
  2.3. Distribution at an Access Point
3.0. Client Device
4.0. Detecting an Identifier
5.0. Selecting a Coupon Offer Based on the Identifier
6.0. Identifying the User
7.0. Distributing a Coupon
8.0. Preliminary Activities Conducted Prior to Coupon Distribution
9.0. Verifying that the User has Participated in a Prerequisite Activity
10.0. Implementation by a Coupon Management Application
11.0. Implementations Involving Generic Identifier Detection Applications
12.0. Distribution Restrictions
13.0. Identifiers Corresponding to User's Device
14.0. Coupon Distribution by Client Device 15.0. Distribution of Identifier-Bearing Mechanisms
16.0. Miscellaneous
17.0. Example Process Flows
18.0. Example Coupon Distribution System
   18.1. Coupon Provider/Distributor
   18.2. Coupon Distribution Server
   18.3. Client
   18.4. Information Server
   18.5. Retailer
   18.6. Variations and Alternatives
19.0. HARDWARE OVERVIEW

1.0. GENERAL OVERVIEW

Approaches, techniques, and mechanisms are disclosed for distributing coupons via interactions with mobile devices. In an embodiment, a client device detects a Quick Response (QR) code. The client device decodes the QR code to identify data encoded within the QR code. The client device determines that the data encoded within the QR code includes a uniform resource locator (URL). Based on the URL, the client device sends a first request to a first server identified by the URL. In response to the first request, the client device receives, from the first server, data configured to cause the client device to display, to a user of the client device, at least one of: a video or an interactive web page. Responsive to at least the data encoded in the QR code, the client device sends to a coupon server: identification data associated with a user of the client device, and a request for the coupon server to distribute a digital coupon for an offer associated with the QR code to an account associated with the user.

In an embodiment, the request for the coupon server to distribute a digital coupon includes at least a portion of the URL. In an embodiment, the client device receives, from the first server, confirmation of at least one of: the user has completed viewing of the video, or the user has completed the interactive web page. The client device sends the request to the coupon server responsive to the client device receiving the confirmation. In an embodiment, the client device selects the offer to request based at least on an identifier encoded within the QR code. In an embodiment, the client device receives, from the coupon server, an indication of which digital coupon was added to the account. The client device displays information about the digital coupon to the user.

In an embodiment, a coupon management application or related configuration routine configures a client device to call the coupon management application upon receipt of data that matches predefined criteria. The coupon management application, while executing on the client device, is invoked with a call that includes first data that matches the predefined criteria. The coupon management application receives, from a first server, confirmation data indicating that a user of the client device has participated in a prerequisite activity for obtaining a coupon. Responsive to receiving the confirmation data, the coupon management application sends to a coupon server: identification data associated with the user of the client device, and a request for the coupon server to distribute a coupon for an offer associated with the first data to the user.

In an embodiment, responsive to the call that invokes the coupon management application, and based on the first data, the coupon management application instructs the client device to send a request to the first server to conduct the prerequisite activity. In an embodiment, the first data is data that was decoded from one of: a Near Field Communication (NFC) signal, an RFID signal, a QR code, a digital image, or an audio signal. In an embodiment, the first data is a uniform resource identifier (URI). In an embodiment, the first data is one of: at least a portion of the confirmation data, or data that is communicated from the first server in association with the confirmation data.

In an embodiment, the coupon management application selects the offer to request based at least on one of: the first data, or the confirmation data. In an embodiment, the coupon management application includes, with the request, data to assist the coupon server in selecting the offer, the data including at least one of: current location data for the user, or data returned from the first server. In an embodiment, the coupon management application selects the offer to request based on at least one of: current location data for the user, data returned from the first server, historical data indicating other coupons associated with the account, historical data indicating items purchased in transactions involving the user, or historical data indicating items added to a shopping list at the client device.

In an embodiment, the coupon management application receives, from the coupon server, an indication of a digital coupon that was added to an account associated with the user in response to the request from the coupon management application. The coupon management application displays, at the client device, information about the digital coupon to the user.

In an embodiment, the first server is the coupon server. In an embodiment, the predefined criteria include at least one of: a protocol identifier, or a portion of a uniform resource locator (URL). In an embodiment, the identification data is at least one of: a client identifier, a session identifier, or a user identifier.

In an embodiment, one or more computing devices execute one or more instructions encoded in a computer-readable media, such as a media bearing a QR code that is scanned by a client device. Execution of the one or more instructions causes performance of the following. The client device, acting upon the instruction(s), sends a first request to a first server. Responsive to the first request, the first server returns to the client device at least one of: an interactive web page, or a video. Further responsive to the instruction(s) encoded in the QR code and/or data returned from the first server in response to the first request, the client device sends to a coupon server: identification data associated with a user of the client device, and a second request for the coupon server to distribute a coupon for an offer associated with a first identifier to the user. The coupon server identifies a specific offer based on the first identifier. The coupon server distributes the coupon by performing at least one of: storing a digital coupon for the specific offer in an account associated with the user; or sending a message to the user with instructions for generating a print coupon for the specific offer. The coupon server returns to the client device, for display at the client device, information about the distributed coupon and the specific offer.

In an embodiment, the one or more instructions are a URL encoded within a QR code. The URL specifies at least the location of the first server and instructions to include in the request to the first server. In an embodiment, the one or more instructions, when executed by the one or more computing devices, further cause performance of: the first server detecting an event, the event being one of: the user successfully completing the interactive web page, or the user fully watching the video; responsive to the first server detecting the event, the first server sending confirmation data to the client device; and the client device sending the second request to the coupon server responsive to the confirmation data.

In an embodiment, the one or more instructions, when executed by the one or more computing devices, further cause performance of: calling a coupon management application at the client device, wherein the coupon management application is separate from a standard web browser of the client device; the coupon management application of the client device sending the identification data and the second request to the coupon server.

In an embodiment, an apparatus such as an NFC tag comprises a signal emitter configured to transmit a signal that encodes one or more instructions that, when interpreted by one or more computing devices, cause performance of the steps described herein.

In an embodiment, a system comprises an access point of one or more computing devices. The access point comprises an NFC reader configured to receive NFC signals encoding portable identifiers. The access point further comprises one or more communication interfaces coupled to a coupon distribution server. The access point further comprises one or more retail-side processors configured to perform: in response to the NFC reader detecting an NFC signal that encodes a particular portable identifier, sending the particular portable identifier to the coupon distribution server via the one or more communication interfaces.

In an embodiment, the system further comprises the coupon distribution server. The coupon distribution server comprises one or more memories that store mappings of portable identifiers to user identifiers. The coupon distribution server further comprises one or more server-side processors configured to perform: selecting a coupon offer; locating a particular user identifier associated with the particular portable identifier based on the mappings; and distributing a coupon to a user associated with the particular user identifier by performing at least one of: storing a digital coupon for the specific offer in an account associated with the user; or sending a message to the user with instructions for generating a print coupon for the specific offer.

In an embodiment, the one or more server-side processors are further configured to perform: selecting the coupon offer based on an access point identifier for the access point. In an embodiment, the one or more retail-side processors are further configured to perform: selecting a coupon offer identifier from a plurality of coupon offer identifiers; and sending the coupon offer identifier to the coupon distribution server with the particular portable identifier.

In other aspects, the invention encompasses computer apparatuses and computer-readable media configured to carry out the foregoing steps.

2.0. FUNCTIONAL OVERVIEW

A coupon distributor provides coupons or coupon offers to a user in response to the user utilizing a client device to detect an identifier in based on data sensed by one or more sensors at the device, such as in data encoded in a quick response (QR) two-dimensional bar code or transmitted by a near field communications (NFC) tag such as a radio-frequency identification (RFID) tag. Based on information in or associated with the identifier, such as a URL or coded instructions, the client device causes the performance of one or more actions that result in the distribution of a coupon to the user of the client device. The actions may include operations performed by one or both of the client device and a coupon distribution server with which the client device communicates. In an embodiment, prior to distributing the coupon, preliminary actions may be performed or are required to be performed, such as displaying a video or conducting a survey.

In an embodiment, a client device scans or otherwise detects an identifier. Based on the identifier, the client device causes a coupon to be distributed to a user of the client device.

In an embodiment, a client device scans or otherwise detects an identifier. Based on the identifier, the client device sends a request to a server to distribute a coupon for an offer associated with the identifier to a user of the client device.

In an embodiment, a client device scans or otherwise detects an identifier. Based on the identifier, the client device engages in an activity, such as displaying a website, displaying a video, and/or gathering data from a user. Upon terminating the activity, a coupon for an offer associated with the identifier is generated for the user. Completion of the activity may be configured as a required step or condition to obtaining the coupon or offer.

In an embodiment, an access point detects an identifier associated with a portable device. The access point sends a request to a server to distribute a coupon to a user associated with the identifier.

2.1. Distribution by Scanning a QR Code

Figure 2:
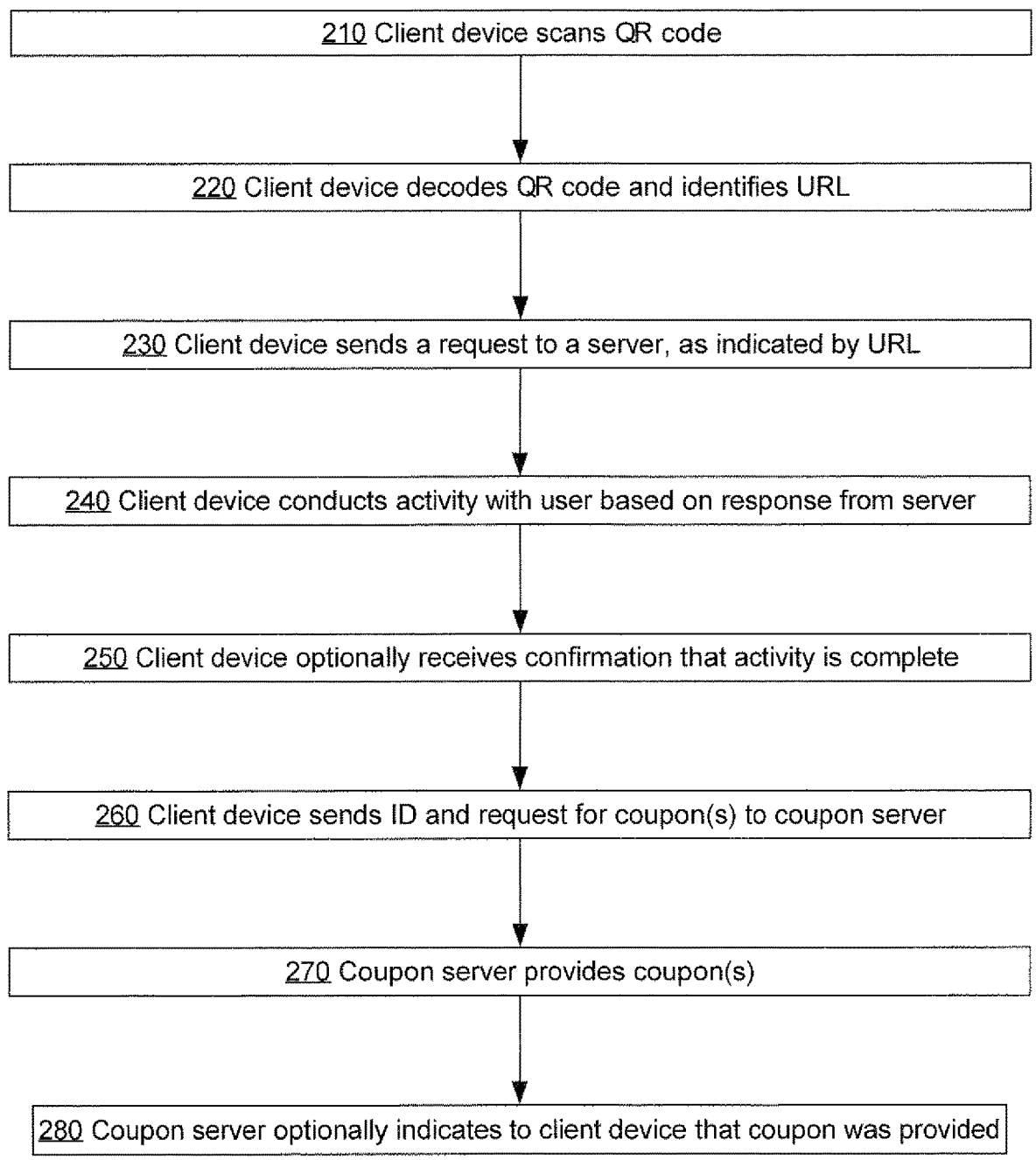
FIG. 2 illustrates a flow for distributing coupons in response to a client device scanning a QR code.

FIG. 2 illustrates a flow 200 for distributing coupons in response to a client device scanning a QR code, according to an embodiment.

At block 210, a client device scans a QR code. The client device may do this, for example, by using an attached or embedded image sensor to capture an optical image of media to which the QR code has been printed, converting the optical image into a digital signal, and then applying signal processing techniques to recognize the QR code. Other scanning techniques may also be used, without limitation. In an embodiment, block 210 is initiated by the user instructing the client device to scan for a QR code via, for instance, a dedicated scanning application or a coupon management application. In an embodiment, block 210 is initiated by the user capturing or otherwise receiving a digital image, and then instructing the client device to analyze the digital image for one or more QR codes.

At block 220, the client device decodes the QR code and identifies a URL in the decoded data. At block 230, the client device sends a request to a server, as indicated by the URL. For example, the URL may instruct the client device to send a GET HTTP request for a video, web page, web application, or other resource to a server at a specified IP address or domain, along with certain query-value pairs or target identifiers. In an embodiment, blocks 220 and 230 are performed at the client device by an application that was responsible for scanning the QR code in block 210. In an embodiment, block 220 is performed by the scanning application, which then invokes another application such as a web browser to perform block 230. In an embodiment, portions of the URL, such as the protocol name or domain name, instruct the client device to invoke a specific application, such as coupon management application, to perform block 230.

At block 240, the client device conducts an activity with the user based on instructions or other data received from the server in response to the request of block 230. For example, the client device may present to the user a video or interactive web page that was received from the server in response to the request of block 230. Block 240 may further comprise submitting additional requests and/or receiving additional information from the server. For instance, the interactive web page may comprise one or more forms that the user is invited to fill out and submit to the server.

At block 250, the client device optionally receives confirmation that the activity of block 240—be it watching a video, filling out a survey, subscribing to a newsletter, sending a message to a friend, and so on—is complete. In an embodiment, block 250 comprises the client determining that an activity has been completed, such as waiting until a video has been played back in its entirety (or at least to a certain percentage thereof). In an embodiment, block 250 comprises the client device receiving confirmation data indicating completion of the activity from the server. For example, confirmation data may take the form of an HTTP response code that redirects the client device to a URI that instructs the client device to perform block 260. In an embodiment, block 250 comprises the server communicating with yet another server, such as a social network server, to verify that an activity has been performed. In an embodiment, block 250 comprises the server analyzing form data from the user to verify that it meets certain qualifications. In yet other embodiments, the client device is configured to proceed with block 260 regardless of whether confirmation is received per block 250.

At block 260, the client device sends, to a coupon distribution server (also referred to as coupon server), user identification data and a request for coupon associated with the QR code. The user identification data may be any combination of session identifiers, cookies, client device identifiers, user names, and so forth. The request may optionally include offer identifier(s) or other offer selection criteria that were included in the QR code and/or any confirmation data received in block 250.

For example, the confirmation data of block 250 may comprise a URL that instructs a browser or other application at the client device to perform block 260 by sending a specified request to a coupon server. As another example, the confirmation data of block 250 may include a URI that instructs the client device to call a coupon management application to perform block 260. The URI may include identifiers or other offer selection criteria to pass to the coupon management application. The coupon management application is configured to send the request of block 260 responsive to this call. As another example, the data decoded from the QR code may comprise offer identifiers or other offer selection criteria, either in the URL identified in block 220, or in other instructions found in the QR code. In either case, the coupon management application may parse identifiers or other offer selection criteria from the decoded QR code. The request may also optionally include offer selection criteria that were not found in the QR code or confirmation data, such as location data, user history data, or user preferences.

In embodiments involving a coupon management application, the coupon management application may perform additional interactions with the user prior to submitting the request of block 260. For example, a coupon management application may identify one or more possible offers that the user is eligible for based on offer identifiers or other criteria in the QR code and/or confirmation data. The coupon management application may present information about the one or more possible offers. The coupon management application may then request that the user select one or more of these offers and/or confirm that the user is interested in receiving a coupon for one or more of these offers.

In an embodiment, block 260 may further involve the client device requesting, on behalf of the coupon server, that the user provide the user identification information. However, in yet other embodiments, the user identification information is already known to the coupon management application and/or coupon server based on previous interactions with the user.

If the client device is configured to receive the confirmation data described in block 250, the request of block 260 is not submitted until after the confirmation data is received. Optionally, data in the QR code may instruct the client device whether to wait for confirmation data per block 250, or even whether to perform 230-250 at all.

At block 270, based on data provided in block 260, the coupon server provides one or more coupons in response to the request of block 260. The coupon server may provide a digital coupon by saving it to an account associated with the user, or the coupon server may provide a message to the user indicating how the user may obtain a printed copy of the coupon. In an embodiment, the coupon server provides coupons for any and all coupons that are mapped to the offer identifiers and/or offer selection criteria received in block 260. In an embodiment, the coupon server uses the offer identifiers and/or offer selection criteria provided in block 260 to select one or more offers for which the coupon server will provide coupons in block 270.

At block 280, the coupon server optionally provides an indication to the client device that the one or more coupons have been provided to the client. This indication may further indicate the offer(s) that the coupon(s) were provided for, if not already known to the client device. For example, a coupon management application may receive an instruction from the coupon server to update a list of coupons that have been "saved" to the user's loyalty cards. The coupon management application may also be instructed by the coupon server (or the server of block 230-250) to update a shopping list to include one or more products related to the provided coupon(s) or the activity conducted in block 240.

Flow 200 is an overview of but one example flow for practicing the techniques described herein. Other flows may include additional, fewer, and/or different elements in potentially different arrangements. For example, in an embodiment, elements similar to those found in flow 200 are performed in response to detecting certain types of data encoded in wireless signals such as transmitted by NFC tags. Examples of other flows, as well as more specific details of the elements in flow 200, are provided in other sections of this disclosure.

2.2. Distribution Using Coupon Management Application

Figure 3:
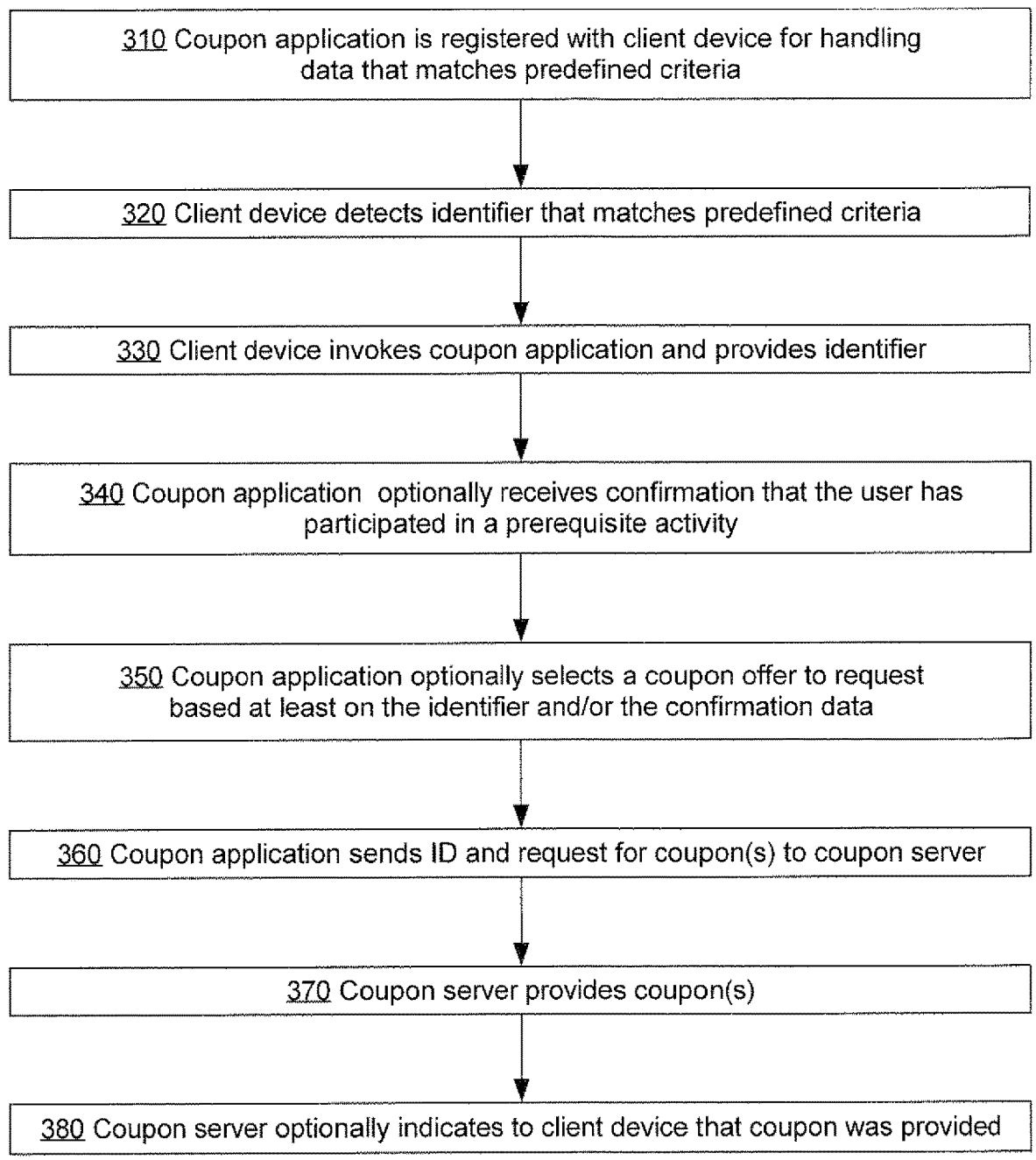
FIG. 3 illustrates a flow for distributing coupons in response to a client device detecting an identifier.

FIG. 3 illustrates a flow 300 for distributing coupons in response to a client device detecting an identifier, according to an embodiment. Flow 300 recites a technique that specifically involves a coupon management application that is installed on a client device. Other techniques may or may not involve a coupon management application.

At block 310, a coupon management application is registered with a client device for handling instructions or other data that match predefined criteria. For example, an installer or configuration utility for the coupon management application may establish one or more registered handles or "intents" to handle certain types of actions and/or mappings of certain protocols or domain names to the coupon management application.

At block 320, the client device detects data (hereinafter an "identifier") that matches the predefined criteria. The data may be detected in any of a variety of forms, including without limitation in an encoded form such as found in a NFC signal or QR code, or in an instruction from a server that is responsive to a request from the client device over a network.

At block 330, based on the registration of block 310, and responsive to detecting the identifier, the client device invokes the coupon management application and provides the identifier.

At block 340, the coupon management application optionally receives confirmation that a user of the client device has participated in a prerequisite activity, such as viewing a web page or a video. In an embodiment, the confirmation is the identifier. In other embodiments, the confirmation arrives separately. For example, the coupon management application may conduct the prerequisite activity and thus provide the confirmation to itself. As another example, the coupon management application may interact with a server to conduct the prerequisite activity, and thus wait to receive or execute a confirmation instruction from the server. As another example, the prerequisite activity may be conducted in part by a web browser or other application that is different from the coupon management application. The coupon management application may thus wait in the background for a confirmation instruction from the other application.

At block 350, the coupon management application optionally selects a coupon offer to request based at least on the identifier and/or the confirmation data. The selection may further involve input from a user or a sensor on the client device, such as a location sensor or a sensor that detected the identifier of block 310. In other embodiments, this selection will instead be performed by a coupon server after block 360.

At block 360, the coupon management application sends, to a coupon server, identification data for the user and a request for a coupon associated with the identifier detected in block 310. Block 360 may be performed in similar manner to block 260 of flow 200.

At block 370, based on data provided in block 360, the coupon server provides one or more coupons in response to the request of block 360. Block 370 may be performed in similar manner to block 270 of flow 200.

At block 380, the coupon server optionally provides an indication to the client device that one or more coupons have been provided to the client. Block 380 may be performed in similar manner to block 280 of flow 200.

Flow 300 is an overview of but one example flow for practicing the techniques described herein. Other flows may include additional, fewer, and/or different elements in potentially different arrangements. Examples of other flows, as well as more specific details of the elements in flow 300, are provided in other sections of this disclosure.

2.3. Distribution at an Access Point

Figure 4:
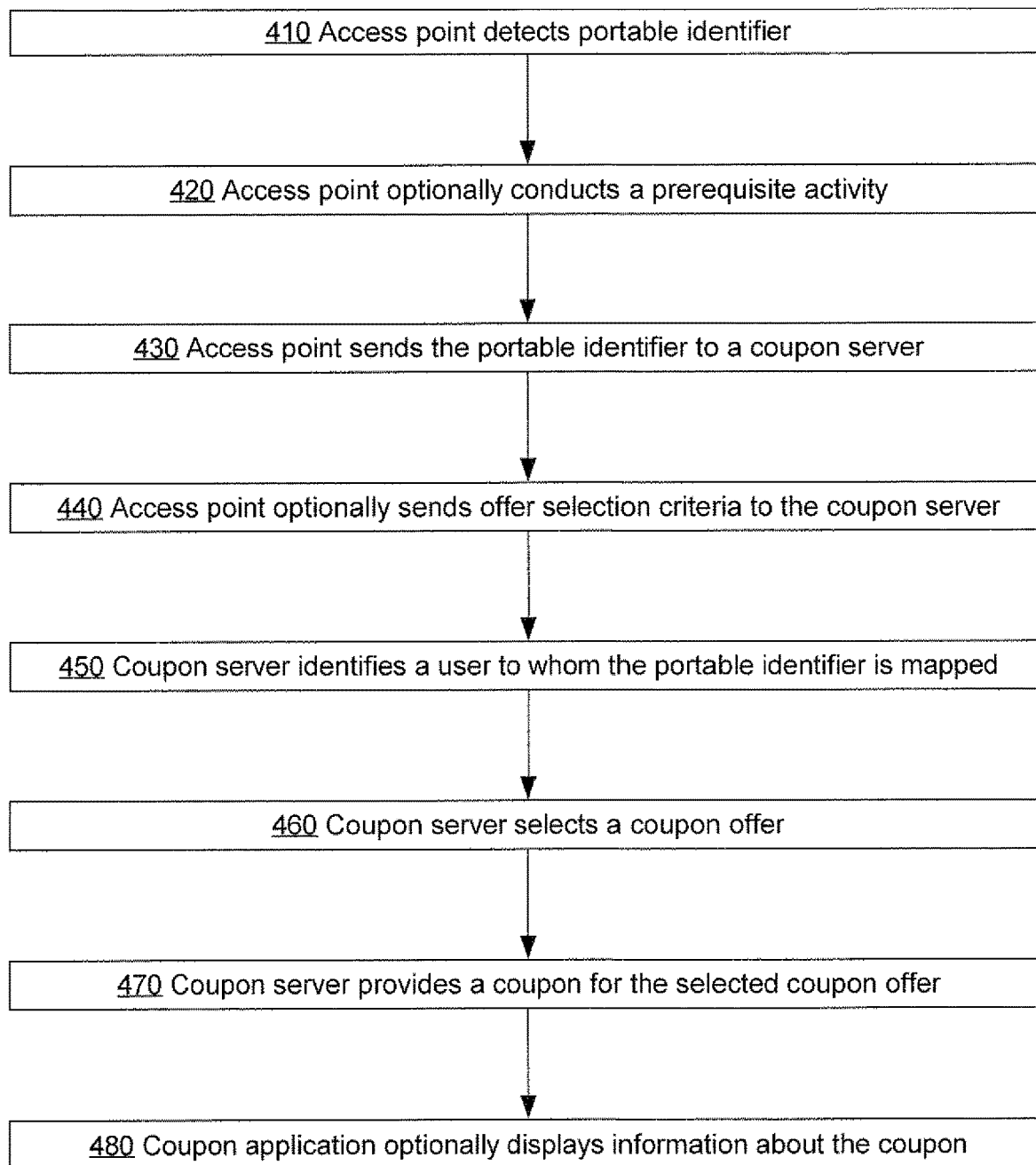
FIG. 4 illustrates a flow for distributing coupons in response to an access point detecting a portable identifier.

FIG. 4 illustrates a flow 400 for distributing coupons in response to an access point detecting a portable identifier, according to an embodiment.

At block 410, an access point detects a portable identifier, such as a passive NFC tag, an active NFC identifier transmitted by a portable computing device, or a Bluetooth MAC identifier. In an embodiment, the access point is any device or combination of devices deployed in a retail store or public space. For example, the access point may be a standalone terminal located in a stadium. Or the access point may be a combination of a thin client terminal, deployed strategically in an aisle at a retail store, coupled via a network to a backend retail server.

In an embodiment, block 410 may be activated, at least in part, by a user instructing a portable device to transmit the portable identifier. In an embodiment, block 410 may be activated simply by the user bringing a portable device within communications range of the access point.

At block 420, the access point optionally conducts a prerequisite activity with the user responsive to the detecting of block 410. For example, if the access point includes a display and/or speakers, the access point may present text, audio, and/or visual information to the user. The access point may further require input from the user via any suitable input mechanism. In an embodiment, the access point is configured to utilize the user's portable device as an input/output device. For example, the access point may send text, audio, and/or visual information to the portable device directly and/or obtain input from the user via the portable device. As another example, the access point may send instructions to the portable device to access information on a server. In an embodiment, the portable identifier is used to tailor the prerequisite activity to the user, based on, without limitation, previous interaction with the access point, purchase history, preference data, and so forth. In other embodiments, however, no prerequisite activity is necessary.

At block 430, the access point sends the portable identifier to a coupon server. For example, the access point may communicate the identifier directly to the coupon server via a back-end network. Alternatively, the access point may send the portable identifier to the client device, and the client device may then send the portable identifier to the coupon server.

At block 440, the access point optionally sends offer selection criteria to the coupon server. The offer selection criteria may include, without limitation, one or more offer identifiers that were randomly or otherwise selected by the access point, location data for the access point, an access point identifier, and/or information input by the user during the prerequisite activity. Blocks 440 and 430 may be performed with the same request.

At block 450, coupon server identifies a user to whom the portable identifier is mapped.

At block 460, coupon server selects a coupon offer. At block 470, the coupon server provides a coupon for the selected coupon offer. Blocks 460 and 470 proceed in similar manner to block 270 of flow 200.

At block 480, if the portable identifier was associated with a computing device (as opposed to a passive tag), a coupon application executing at the portable device optionally displays information about the coupon using any suitable display technique. For example, block 480 may comprise the coupon server looking up an address for the portable device and pushing a notification to the address. Or, block 480 may comprise the access point providing the information to the portable device.

Flow 400 is an overview of but one example flow for practicing the techniques described herein. Other flows may include additional, fewer, and/or different elements in potentially different arrangements. Examples of other flows, as well as more specific details of the elements in flow 400, are provided in other sections of this disclosure.

3.0. CLIENT DEVICE

The client device is any device capable of detecting an identifier based on data sensed by one or more sensing components at the device. Possible sensing components may include, without limitation, scanners, cameras, NFC readers, barcode readers, GPS receivers, other receivers, radios, and microphones. The client device may further be equipped with components for executing instructions to interpret data captured by the sensing components as identifiers. The client device may further be equipped with processing components for executing one or more applications. The client device may further be equipped with one or more network interfaces for communicating with a coupon distribution server either continuously or on a periodic basis. However, in an embodiment no connection to a coupon distribution server is required.

In an embodiment, the client device is a portable device, such as a mobile phone, PDA, tablet computer, and so on. In an embodiment, the client device is uniquely associated with a user. In an embodiment, multiple users may be associated with the same client device, and/or multiple client devices may be associated with the same user. Other embodiments may feature other types of client devices, such as a laptop or desktop computer coupled with a webcam or scanner.

4.0. DETECTING AN IDENTIFIER

In an embodiment, the coupon distribution process begins with the client detecting data that functions, at least in part, as offer-selection criteria. For convenience, this data is referred to herein as an identifier. Some or all of the information in the identifier may be mapped by itself or in combination with other offer-selection criteria to one or more coupon offer identifiers. The identifier may include any of a variety of information. For example, the identifier may include a uniform resource locator (URL) and/or other types of instructions in any suitable language. In an embodiment, the identifier (or a portion thereof) uniquely identifies a product or coupon offer. For example, the identifier may be a coupon offer identifier, a serial number for a pre-generated coupon, a product UPC, or a set of name-value pairs for parameters of a coupon offer. In an embodiment, the identifier includes a location, such as a GPS coordinate, cell phone tower, store, or address.

The identifier may be detected in a variety of manners. For example, the identifier may be encoded in a QR code or barcode attached to a consumer product or a stationary object. As another example, the identifier may be encapsulated in data transmitted from another device, such as an NFC tag, infrared transmitter, WiFi radio, or Bluetooth device. In an embodiment, the identifier may be detected from a location sensor. In an embodiment, the identifier may be encoded in an image of or audio clip recorded from, for instance, a place, product, or person. For example, a user could take a picture of a store or product, or record a clip from a song or movie, and receive a coupon related to the picture or recording. In an embodiment, the identifier may be detected as a result of applying one or more lookup operations and/or recognition algorithms to any of the above data.

In an embodiment, the user initiates the detection process by instructing the device to capture data using a sensing component, such as a camera, and to analyze the captured data for identifiers, such as QR codes. The user then positions the device and/or the sensing component in such a position that the sensing component may capture data that the user believes to encode or correspond to an identifier. The client device attempts to detect identifiers in the captured data using any suitable identifier recognition technique. In an embodiment, rather than requiring an explicit instruction from the user, the detection process is ongoing, executed by an application that periodically receives data from a sensing component at the client device.

In an embodiment, the user may initiate the identifier detection process via one or more instructions to any of a variety of applications executing at the client device. For example, the user may instruct an imaging application to scan for and act upon a QR code. In an embodiment, the identifier detection process is initiated by an application or device component that constantly or periodically monitors data from a sensor, such as a driver for an NFC reader. In an embodiment, various sub steps of the identifier detection process may be performed by the initiating application making API calls to various components of the device, such as to an image capture library. In an embodiment, various sub steps of the identifier detection process may be performed by the initiating application making requests to various server components, such as an off-client pattern recognition analysis component or identifier resolution database.

In an embodiment, the identifier is encoded as a signal from an emitting device that is configured with logic to select from a plurality of different identifiers to provide the client device. The emitting device may select from these different identifiers based on any one or more of: current transaction information, current time, random selection, analysis of current inventory and/or purchasing trends, a device or user identifier transmitted from the client device, location history data for the client device, and so forth.

5.0. SELECTING A COUPON OFFER BASED ON THE IDENTIFIER

In an embodiment, once the identifier has been detected, a coupon offer is selected based on the identifier. This process may involve decoding the identifier, if necessary. For identifiers that include executable instructions, this process may further involve evaluating the executable instructions. In an embodiment, beyond these two optional steps, the offer selection process is relatively simple, as the identifier (or decoded identifier) may explicitly specify the coupon offer to be selected. For example, the identifier may be a unique offer identifier, or may contain a parameter-value pair specifying the unique offer identifier. In an embodiment, the identifier may specify multiple offers, and the user may be provided with coupons for each of the specified offers.

In an embodiment, the identifier does not explicitly identify a coupon offer. Rather, one or more coupon offers may be selected on the basis of other information in the identifier. For example, the identifier may include information such as a product identifier, store identifier, and/or location identifier. The user may be matched with one or more qualified coupon offers based on such information. As another example, the identifier may include an address of a server-side application that randomly (or pseudo-randomly) selects one or more coupon offers for the user. As another example, the identifier includes a list of coupon offers. One or more offers may be selected from the list at random. Various combinations of the above approaches may also be used.

In an embodiment, the selection of one or more coupon offers may further involve external factors, such as user preferences, user shopping histories, whether a user is eligible for a coupon offer, coupon offer distribution parameters, the current date and/or time, the location of the client device (e.g., if the identifier is not a stationary identifier that includes location information), weather forecasts, the type of the client device (e.g. portable as opposed to desktop), the contents of the user's shopping list, user-provided information during a preliminary activity triggered by the identifier, coupon inventory data, per-user coupon distribution limits, the coupons already associated with the user's account or device, data indicating coupons redeemed by other users in a same location as the user, and so on. For example, a user may be provided coupon offers of greater value when the user is not at a store and of lesser value when the user is already at a store. As another example, the user may be provided coupon offers of lesser value when an item is already on the user's shopping list and of greater value when the item is not on the user's shopping list. As another example, the user may be provided different coupon offers depending on how the user responds to a web survey presented to the user in response to the detection of the identifier.

In an embodiment, the coupon offer is selected by the client device. However, in other embodiments, the client device may simply relay the identifier to a coupon distribution server to request that the coupon distribution server select the coupon offer. In yet other embodiments, the coupon offer may be selected by a third-party information server.

In an embodiment, regardless of how the coupon offer is selected, the user may be asked to confirm that the user wishes to receive a coupon for the selected coupon offer. To assist the user in making a decision, the client device may present various information about the coupon offer. Such information may be provided, for example, by the coupon distribution server or a periodically updated client-side database. However, the client device need not necessarily provide the user with any information about the coupon offer prior to requesting confirmation. Furthermore, in an embodiment, the client device does not request confirmation, or the user may disable confirmation requests.

6.0. IDENTIFYING THE USER

In an embodiment, the user is identified prior to coupon distribution. For example, the coupon distribution server may require a known user identifier in order to determine an account or an address to which the coupon will be distributed. In some embodiments, user identification may also or instead be utilized to enforce coupon distribution limits or determine which coupon offer to select. In some embodiments, however, user identification is not necessary.

In an embodiment, the user identifier is obtained via a log-in process at the client device in which the user provides credentials such as a user name and/or account number. The log-in may occur at any time, including both before the detection of an identifier or in response to the detection of an identifier. A log-in interface may be generated by an application executing at the device, and the application may then validate the log-in based on verification information provided by the coupon distribution server. Or, the log-in interface may be generated by the coupon distribution server and presented at the client device using a thin-client application such as a web browser. In an embodiment, an appropriate user identifier may be determined utilizing authentication information generated during a previous log-in at a server other than the coupon distribution server, such as third party user authentication server. In an embodiment, upon credentials being verified, a session may then be established. A session identifier is mapped to the user identifier. The session identifier may then be used in subsequent communications. In an embodiment, an appropriate user identifier may be determined utilizing a unique device identifier that has been previously mapped to the user identifier.

In an embodiment, user identification occurs without requiring information sufficient to specifically identify the user. For example, the user may be identified solely by an identifier associated with an account containing no personally identifying information, thus maintaining the user's privacy.

7.0. DISTRIBUTING A COUPON

Once a coupon offer has been selected and, optionally, the user has been identified, a coupon may be distributed to the user by any suitable mechanisms. For example, the coupon distribution server may deliver an image of a coupon for the selected offer to the client device, and the client device may print or display the image. As another example, the coupon distribution server may cause a physical coupon for the selected offer to be delivered to an address associated with the user. As another example, the coupon distribution server may add a digital coupon for the selected offer to one or more accounts associated with the user, such as store loyalty card accounts. As another example, a coupon code for the coupon may be emailed or delivered by SMS to the user's device. As another example, the coupon code may be delivered to the coupon management application, from which it may be displayed to a cashier as a store during checkout for redemption. Example coupon distribution mechanisms are discussed in further detail in U.S. application Ser. No. 12/878,231, filed Sep. 9, 2010, which is hereby incorporated by reference for all purposes as though set forth in its entirety.

In an embodiment, the user may be presented with one or more options for selecting how to distribute the coupon. For example, the user may be asked to select one or more store loyalty account(s), phone numbers, or other unique identifiers with which a digital coupon should be associated. Or the user may be asked to choose between printing a coupon and receiving a coupon by mail or email.

8.0. PRELIMINARY ACTIVITIES CONDUCTED PRIOR TO COUPON DISTRIBUTION

In an embodiment, the actions performed responsive to the client device detecting the identifier may include conducting one or more preliminary activities, such as presenting information to a user and/or collecting information from the user, prior to distributing the coupon to the user. For example, in response to scanning a QR code, the application may present a video advertising a product. Or, in response to detecting an RFID tag, the application may present the user with a survey.

In an embodiment, performance of the preliminary activity is a prerequisite for distributing a coupon. That is, the coupon is only distributed when the client-side application has verified that the preliminary activity has been performed successfully. Thus, with respect to the examples above, if the user terminates the video before it has completed or fails to complete the survey, the user is not provided with a coupon. However, in an embodiment, the coupon may be distributed in response to any termination event, regardless of whether the activity was performed successfully.

In an embodiment, the identifier includes a URL for a client-side or server-side application that will conduct one or more preliminary activities. For example, the identifier may be a URL to a video advertisement server, along with one or more parameters by which the video advertisement may select a specific video to present to the user. As another example, the identifier may be a URL that is handled by a client-side application that caches advertisements. The client-side application may optionally utilize parameters from the URL to select an appropriate advertisement. As another example, the identifier may be a URL to a web application containing a form for collecting information from the user, such as answers to a survey.

In an embodiment, the URL may include additional parameters that are used to identify a coupon offer and not the preliminary activity. These additional parameters may be ignored by a third-party server. In an embodiment, the URL of the preliminary activity is itself an identifier mapped to one or more coupon offers at the coupon distribution server. In an embodiment, the identifier encoded in the QR code or received signal includes one or more coupon offer identifiers that are utilized entirely separate from the URL for the preliminary activity. In an embodiment, a third-party server responsible for conducting the preliminary activity is configured to return a coupon offer identifier and/or offer selection criteria to the client device and/or the coupon distribution server.

In an embodiment, the identifier may include executable instructions that cause a client-side application to perform or initiate preliminary activities such as described above. In an embodiment, the identifier does not directly specify a preliminary activity. However, the client device or the coupon distribution server may select one or more preliminary activities based on the identifier. For example, if the identifier was associated with a certain product, the client device may request that the coupon distribution server provide instructions or a URL for conducting an activity chosen by the manufacturer of the product. As another example, the coupon distribution server may, in response to detecting that a manufacturer has requested performance of a particular activity in exchange for a selected coupon offer, cause the client device to engage in the particular activity prior to distributing a coupon for the selected coupon offer.

9.0. VERIFYING THAT THE USER HAS PARTICIPATED IN A PREREQUISITE ACTIVITY

As mentioned above, certain preliminary activities may be required prior to coupon distribution. Some activities, such as displaying videos or conducting surveys, may require the user to interact with a server. In some embodiments, the activities may be conducted by servers other than the coupon distribution server. Accordingly, the other servers must be configured to inform the client device or the coupon distribution server that the user has successfully participated in the prerequisite activity.

In an embodiment, the server conducting the preliminary activity is configured to return a particular message or other confirmation data to the client device or coupon distribution server indicating successful performance of the activity. Upon requesting the server to conduct the preliminary activity, the client device or coupon distribution server may be configured to wait for the receipt of the particular message before proceeding. In an embodiment, returning the particular message is hard-coded into the server-based application that conducts the preliminary message. In an embodiment, the server-based application may be instructed to return the particular message via various parameters or a callback URL in the initial request to conduct the preliminary activity. In an embodiment, the server could return a web page with embedded confirmation data that the client device inspects to verify that the prerequisite activity has been completed.

10.0. IMPLEMENTATION BY A COUPON MANAGEMENT APPLICATION

In an embodiment, a coupon management application executing on a client device performs some or all of the steps described herein as being performed by the client device. The coupon management application may also perform other functions such as searching for coupon offers, printing coupons, obtaining user identification data, adding coupons to the user's store loyalty cards, displaying coupons that that have been added to the user's account, managing a shopping list, presenting or delivering coupons during a transaction, authenticating the client device to a coupon distribution server, and so on. Several examples of such a coupon management application are described in U.S. application Ser. No. 12/896,206, filed Oct. 1, 2010, which is hereby incorporated by reference for all purposes as though set forth in its entirety. However, the coupon management application is any application configured to respond to identifiers as described herein by requesting or causing distribution of coupons to the user, and does not necessarily need to support any particular function described above. In an embodiment, the coupon management application is separate from the standard web browser of the client device, and is optimized for finding coupon offers and/or viewing coupons associated with a user.

In an embodiment, a user may instruct the coupon management application to initiate the identifier detection process. Responsive to an identifier being detected in the captured data, the coupon management application may perform actions such as adding a digital coupon to the user's account, generating a printable coupon, adding a product corresponding to the digital coupon to the user's shopping list, and so forth.

The coupon management application may be configured to communicate with a coupon distribution server to perform some or all of these tasks. For example, the coupon management application may, based on the identifier, request that the coupon distribution server provide the user with a coupon for a particular coupon offer. As another example, the coupon management application may send user-identifying information to the coupon distribution server, along with all or a portion of the detected identifier. The coupon distribution server may then select a particular coupon offer for which to provide the user with a coupon.

11.0. IMPLEMENTATIONS INVOLVING GENERIC IDENTIFIER DETECTION APPLICATIONS

In an embodiment, the identifier detection process may be initiated at any capable application, regardless of whether the application features coupon-specific logic. In such an embodiment, the identifier comprises information by which the detecting application may identify another application capable of providing the afore-mentioned functionality. The detecting application may be, for example, a generic QR code or NFC reader. The other application may be any suitable server-side or client-side application, including both thick clients such as a dedicated coupon management application and thin clients such a web browser.

For example, the identifier may be a URL. In response to detecting the identifier, the detecting application may send a request to a coupon distribution server identified in the URL via, for example, a web browsing component of the client device. The coupon distribution server may then execute an application for selecting an offer and distributing the coupon, and the coupon distribution server may be further guided by data in the path or query string of the URL.

As another example, the identifier may be a URL. The server address portion of the URL may direct the detecting application to send the remainder of the identifier to an appropriate server for processing. The server may be an intermediate server that conducts a preliminary activity and, when the preliminary activity is completed, forwards data to the coupon distribution server.

As another example, the identifier may be a URL that causes the detecting application to make a request to a server as in the previous example. The server may be configured to respond to the request by instructing the client device to send the identifier (or information derived from the identifier) to a coupon management application executing at the client device. If the client device does not have the coupon management application installed, the user may be given the option of downloading and/or installing the coupon management application. The server may optionally conduct a preliminary activity prior to responding to the request.

As another example, the identifier may be a URL with a protocol that is registered to be handled by a coupon management application. The detecting application thus calls the coupon management application and provides it with the identifier. The coupon management application then proceeds as described above.

In an embodiment, the detecting application may also append user identification information to the data sent to a server. For example, the detecting application may send information for identifying the user via a cookie or user agent string. If necessary, however, the server-side application may obtain some or all of the information necessary to identify the user by requesting it from the user or the user's device.

12.0. DISTRIBUTION RESTRICTIONS

In an embodiment, the coupon distribution server may limit the number of coupons that may be redeemed by enforcing distribution limits on offers, so that only a certain amount of identifiers may be created for a particular offer. In an embodiment, the coupon is specifically associated with a user account so that user-based coupon distribution limits may be enforced. Thus, the coupon distributor may limit the number of coupons that a given user may obtain for any particular offer.

In an embodiment, the coupon is unique, in that one or a combination of identifiers uniquely differentiates the generated coupon from all other coupons generated for the same offer. Each unique coupon may only be redeemed once, thus discouraging unauthorized duplication of a coupon.

13.0. IDENTIFIERS CORRESPONDING TO USER'S DEVICE

In an embodiment, coupon distribution may be initiated by an access point device that detects an identifier transmitted by a user's device. For example, a coupon distributor, retailer, advertiser, manufacturer, or like entity may deploy access point devices in well-trafficked locations such as stores, restaurants, stadiums, hotels, and so on. The access points may be configured to monitor for unique identifiers transmitted by portable user devices. The unique identifiers may include, without limitation, passive NFC tags, Bluetooth addresses, MAC address, phone numbers, and so on. A user may register these identifiers with the user's account. When an access point detects that a unique identifier is in its vicinity, the access point instructs a coupon distribution server to distribute a coupon to a user associated with the unique identifier. The coupon may be for a specific coupon offer associated with the access point, or for an offer selected by the access point or coupon distribution server based on techniques similar to those described above.

In an embodiment, the access point behaves similar to the manner described above, except that the access point causes a coupon management application to offer one or more coupons, or a selection of one or more coupon offers, to the user. The access point may communicate directly with the coupon management application to this end, or the access point may trigger the offering by communicating with a coupon distribution server that is capable of communicating with the coupon management application. The coupon management application may or may not reside on the portable device corresponding to the detected identifier. For example, the detected identifier may be a standalone RFID tag, but the coupon management application may execute on the user's tablet computer. The coupon offer may or may not be immediately presented to the user. In fact, in an embodiment, the coupon offer may not be offered to the user until the user has been away from the access point for a certain period of time, or until the user next accesses the coupon management application.

In an embodiment, a coupon management application causes a proprietary unique identifier to be transmitted from the device. This identifier may be transmitted repeatedly, in response to a user command, in response to the user accessing the application, and so on. Thus, the access point initiates coupon distribution only for devices having the coupon management application installed.

In an embodiment, the identifier transmitted to the access point includes information identifying the contents of a shopping list created by the user. The access point may select one or more coupon offers for the user based on the contents of the shopping list. For example, the access point may select a coupon offer corresponding to an item in the shopping list, or may select a coupon offer corresponding to a product that is complimentary to or competitive with an item in the shopping list.

14.0. COUPON DISTRIBUTION BY CLIENT DEVICE

In some embodiments, the client device causes a coupon to be distributed to the user without the client device communicating with a coupon distribution server between the time that an identifier is detected and the coupon is distributed.

For example, in an embodiment, the coupon distribution server may have previously sent to the client information about a coupon that has been pre-generated for the user, including information indicating that the coupon is "locked" (i.e. not eligible for use) until one or more conditions have been met. One of these conditions may be that the client detects a certain identifier, such as by scanning a specific QR code. Once the client has detected this identifier, the coupon is unlocked for the user. However, in other embodiments, pre-generated locked coupons may be tracked and unlocked by a coupon distribution server receiving a request from the client that includes a corresponding identifier.

As another example of server-less distribution, an identifier may include enough information about a coupon to be able to generate a digital coupon without a server. For instance, an identifier may include an offer reference number. The client device may have a database of offer terms associated with the reference number. Or, the identifier may itself specify offer terms. In either case, the client device may thus create a digital or print coupon that the user may utilize during a transaction.

The client device may also be configured with logic for generating a unique coupon based on the above information. For instance, the client device may generate a unique identifier based on a function of a device identifier, user identifier, and/or an offer identifier. Thus, a coupon distribution server or other entity may subsequently be able to track and limit unique coupons that have been redeemed at a retailer. The client device may further be equipped to limit the number of times the client device will create a unique coupon for a specific detected identifier.

As another example of server-less distribution, the client device may be configured with logic for generating a unique coupon identifier based on a function of a device identifier and/or a user identifier, coupled with the detected identifier. In such an embodiment, the client device may or may not be capable of determining what the terms of the coupon are. However, the coupon may still be provided during a transaction, where the retailer is capable of determining the coupon terms based on the unique coupon identifier.

As yet another example of server-less coupon distribution, the detected identifier may include a unique coupon identifier. In such a case, the detected identifier may only be used to generate a coupon once. If the identifier was transmitted from a device with logic for modifying the identifier, the identifier may be modified the next time it is transmitted so as to include a new unique identifier. For example, the transmitting device may increment identifiers, or select identifiers to distribute based on an algorithm or set of identifiers provided to the transmitting device by a coupon distributor.

15.0. DISTRIBUTION OF IDENTIFIER-BEARING MECHANISMS

The techniques described herein generally rely on identifier-bearing mechanisms, including printed media such as QR codes as well as signal-emitting apparatuses, such as NFC tags. In an embodiment, manufacturers may distribute identifier-bearing mechanisms on or in packaging for products, such as on the outside of cereal boxes or on promotional literature included with the product. In an embodiment, advertisers may include identifier-bearing mechanisms in promotional material distributed by conventional means such as product samples and mass-mailings. In an embodiment, manufacturers, advertisers, and/or retailers may place identifier-bearing mechanisms strategically throughout a retail store or public location.

In an embodiment, any of the above distributors of identifier-bearing mechanisms may produce or cause the production of an identifier-bearing mechanism using conventional techniques. The distributor selects an identifier to encode in the identifier-bearing mechanism. In an embodiment, the distributor determines one or more coupon offer identifiers to distribute. The distributor may then select the identifier to encode based on the one or more coupon identifiers. For example, the identifier to encode may include the one or more coupon identifiers. Alternatively, the distributor may communicate with a coupon distributor to establish a mapping between the one or more coupon identifiers and another identifier to be encoded, such as a UPC code or a URL to promotional material on a server hosted by the distributor. Or, the distributor may configure an application at a URL to provide the one or more coupon identifiers to a coupon distribution server or a coupon management application. The distributor may then select the URL as the identifier. In an embodiment, the distributor includes both a URL and offer identifiers in the encoded identifier. For example, offer identifiers may be embedded in the URL as values for certain query string parameters. In an embodiment, the distributor also includes tracking parameters in the encoded identifier. In an embodiment, the distributor determines offer-selection criteria instead of coupon identifiers. In an embodiment, the distributor selects the one or more coupon offer identifiers based on a product associated with the identifier-bearing mechanism. In other embodiments, the distributor selects an identifier to encode using any suitable technique for creating other types of identifiers as described herein.

16.0. MISCELLANEOUS

In an embodiment, coupon distribution is accomplished without informing the user at the time of distribution. For example, where coupon distribution is initiated by an access point device, the user's account may be credited with a coupon without the user being informed. As another example, after engaging in a preliminary activity, the user may or may not be made aware that a coupon has been distributed to the user as a result of engaging in the preliminary activity. In such embodiments, the coupon may be applied to a transaction without the user having known prior to the transaction that the coupon was distributed. The coupon may also be removed from the user's account upon certain conditions being met, such as the user leaving a store, or a certain period of time passing. Removal conditions may be included in the offer terms, or specified by an identifier or access point.

17.0. EXAMPLE PROCESS FLOWS

In an embodiment, a user logs in, or may already be logged in, to a coupon management application. The user instructs the coupon management application to scan a QR code. The coupon management application activates a QR scanning component. Once a QR code is recognized, the QR code is interpreted as an identifier. The identifier includes text-based instructions for requesting that a coupon distribution server generate a coupon for a specific coupon offer. Based on these instructions, the coupon management application issues a request to the coupon distribution server that identifies the user and requests that the coupon distribution server add a digital coupon for the specified offer to the user's store loyalty account(s). The coupon distribution server informs the coupon management application that it has honored the request. The coupon management application displays a list of digital coupons in the user's account, including the newly added coupon. The coupon management application further displays a shopping list that includes one or more products associated with specified coupon offer. The user may then redeem the newly added coupon during a transaction with a retailer by presenting information identifying the user's account during a transaction with the retailer.

In an embodiment, a smartphone periodically monitors for RFID tags. Once a RFID code is recognized, the smartphone interprets the RFID tag as an identifier. The identifier is a text-based URL for a web form at a first server. The smartphone launches a web browser and requests the URL. The first server presents the web form to the user. The user completes the form, in which the user specifies an email address or social networking account. The first server selects a coupon offer based on the form and/or parameters in the URL. The first server forwards the client's web browser to a second URL corresponding to a coupon distribution server.

The first server further causes the client's web browser to identify the selected coupon offer and the user email address or social networking account to the coupon distribution server. The coupon distribution server, upon ensuring that no distribution limits are applicable, sends a link corresponding to a unique printable coupon for the selected coupon offer to the email address or social networking account. The user may subsequently access the link from a device capable of printing the coupon.

In an embodiment, a user causes a portable device to execute a QR scanning application. The QR scanner application detects a QR code and interprets it as a URL. The QR scanner application causes a web browsing component to access the URL. The URL corresponds to a coupon distribution server, and instructs the coupon distribution server to add a coupon to a user account associated with the portable device.

In an embodiment, user instructs a client device to scan a QR code on a product such as a box of pizza. The QR code contains a promotional identifier that causes the client device launch a web-based video advertising new pizza offering. The device then receives an image of a coupon for that offering. The user displays the image from the client device the next time the user orders pizza, and thus receives a discount on the user's next box of pizza.

In an embodiment, a client device detects an identifier transmitted by a Bluetooth access point. The client device creates a notification to the user based on the identifier. When the user requests that the client device provide more information about the notification, the client device displays an advertisement included in the identifier. After the user views the advertisement, the client device generates a unique coupon for the user based on information in the identifier.

In an embodiment, a client device detects an identifier. The client device determines, based on the format of the identifier, that the identifier may be an identifier for distributing a coupon offer. The client device sends the identifier to a coupon distribution server. The server looks up the identifier in a database and locates an associated coupon offer. The server generates a coupon and distributes it to a user account.

In an embodiment, a client device scans a UPC code for a product. The client device determines a category for product that corresponds to the UPC code. This determination may be based on a local database at the client device and/or communication with another server. The client device then identifies a coupon offer in the determined category and causes a corresponding coupon to be generated for the user. In an embodiment, the coupon offer is selected because it is a competing product in the same category, but other embodiments may feature other selection preferences.

18.0. EXAMPLE COUPON DISTRIBUTION SYSTEM

FIG. 1 is a block diagram of an example server-based system 100 for distributing coupons. A coupon distribution server 110 is operated by a coupon distributor 115. The coupon distribution server 110 makes coupon offers available to users, such as user 135, on behalf of one or more coupon providers 195. Coupons may be distributed via a client device 120 coupled to a printer 129 at which the coupons may be printed. Coupon offers may also be made available via user 135 requesting that the coupon offer be saved to his account in association with one or more account identifiers. Coupon offers may also be made available to user 135 in response to client 120 detecting a triggering identifier 150 via a scanning component 128, as described herein. The coupon distribution server relays information about offers saved in association with a user's account to retailer 145. The user may then take advantage of a coupon offer saved to his account by providing account identification 132 to the retailer in a physical or online transaction.

18.1. Coupon Provider/Distributor

In an embodiment, coupon distributor 115 is any entity capable of distributing coupons on behalf of a coupon provider 195, such as a manufacturer, retailer, or advertiser. For the purposes of this application, the act of distributing a coupon may herein refer to either or both of generating a coupon and saving a coupon offer to a user account in association with one or more account identifiers. In this context, generating a coupon may include printing a coupon or creating and storing digital data representing a digital coupon. A coupon provider 195 may contract with coupon distributor 115 to distribute coupons as part of a coupon campaign. The coupon provider 195 supplies coupon distributor 115 with coupon distribution data 194 describing the coupon offer(s), as well as parameters for each coupon campaign, such as a target number of coupons to distribute in aggregate, how many coupons may be supplied to each individual end user, or start and end dates for distribution. In an embodiment, coupon distributor 115 makes coupon offers available on behalf of multiple coupon providers 195.

Coupon providers 195 may transmit coupon distribution data 194 to coupon distributor 115 electronically via a network connecting coupon provider 195 to coupon distribution server 110. For example, coupon distribution server 110 may feature a web application, file sharing, or database access component by which providers 195 may upload coupon distribution data 194 directly to coupon distribution server 110 or coupon data store 112. Coupon providers 195 may also or instead transmit coupon distribution data 194 to coupon distributor 115 by any other suitable means, including orally over a telephone.

18.2. Coupon Distribution Server

Coupon distribution server 110 is operated by a coupon distributor 115 for, among other purposes, making coupons available to users such as user 135. In an embodiment, a server may refer to one or more applications executing on one or more computers or devices that interact with counterpart client applications executing on other computers or devices. Thus, coupon distribution server 110 may be one or more server applications, executing at one or more computing devices operated by coupon distributor 115. In an embodiment, coupon distribution server 110 facilitates the availability of user-selected coupon offers during transactions with retailer 145 without requiring user 135 to actually present a physical coupon. Rather, coupon distribution server 110 saves information about one or more coupon offers to an identifier that the user may provide in place of a coupon when engaging in a transaction at point-of-sale 150. In an embodiment, coupon distribution server 110 is further configured for distributing printable coupons to, among other clients, client 120. However, coupon distribution server 110 need not necessarily be capable of distributing coupons in the manners described above, and may in fact be capable of distributing coupons in other manners, such as direct mailing.

Coupon distributor 115 maintains the data supplied by coupon providers 195 as coupon data 116 in data store 112, which is coupled to coupon distribution server 110. Data store 112 may comprise one or more databases and/or file repositories. Coupon data 116 may take a variety of forms, including database records and/or one or more files. Among other aspects, coupon data 116 may comprise, for each coupon offer, data such as the name of the coupon provider 195 making the coupon offer, distribution parameters, terms of the coupon offer, print layout information and graphics, one or more internal or provider identification numbers, bar code generation information, one or more relevant uniform resource locators (URLs), one or more coupon names or titles, one or more related search terms, one or more related categories, and/or one or more products or UPCs for which a coupon may be valid. Distribution parameters may include aggregate distribution limit values, per device distribution limit values, or per client distribution limit values.

Data store 112 further stores user account data 114. User account data 114 includes data for one or more different user accounts, each of which may or may not be mapped to a unique user. Each of the user accounts may have been established with coupon distributor 115, or may have been established with a retailer 145 and the details thereof may subsequently be communicated by the retailer 145 to coupon distributor 115. For each user account, user account data 114 specifies one or more account identifiers. Each account identifier may in turn be associated with data identifying one or more coupon offers in coupon data 116 that are available to a user. Some or all of the one or more coupon offers may also be associated with other account identifiers associated with the user account. In an embodiment, the account identifiers are associated with unique instances of each coupon offer, wherein each unique instance has a unique coupon identifier. For example, just as each coupon that may be printed by coupon distribution server 110 may have a unique coupon number, a unique coupon number may also be generated each time a user saves a coupon offer to the user's account. However, in other embodiments, user account data 114 does not require unique coupon identifiers.

Data store 112 may also store other information related to coupon distribution and redemption, such as device data, distribution logs, and redemption logs. For example, device data may describe a plurality of devices, including client 120. Each device may be described by a device identifier. Device data may include information such as hardware identifiers, client identifiers, geographic information, and permissions data. As another example, distribution logs may track the number of coupons that have been distributed for each coupon offer described in coupon data 116, including the number of times coupons have been printed and/or the number of times coupon offers have been saved to a user account. Distribution logs may further track how many times each device described in device data and/or user described in user account data 114 has printed coupons for, viewed, and/or saved each coupon offer described in coupon data 116. Distribution logs may further track when coupons were distributed and where the user was located when the user requested coupon distribution. Redemption logs may track which coupons have been redeemed, along with any amount of data about each redemption, including user account identifiers, timestamps, location data indicating where the redemption occurred, and so forth.

Coupon distribution server 110 receives and responds to coupon-related requests from client 120 over one or more networks, such as the Internet. Coupon distribution server 110 retrieves some or all of coupon data 116 to respond to various requests from client 120. For example, client 120 may request coupon distribution server 110 to provide a listing of available coupons, search for a coupon based on keywords, or save a coupon offer to the user account for user 135. In response, coupon distribution server 110 may retrieve any relevant coupon data 116 from data store 112, process the coupon data 116 as appropriate, and, based on that processing, formulate a response to the client.

Coupon distribution server 110 may be configured to control coupon distribution in a number of ways. For example, coupon distribution server 110 may be configured to deny a client permission to print the coupon, in accordance with device-based, client-based, or aggregate distribution limits. As another example, coupon distribution server 110 may be configured to deny a request to save a coupon to a user account if a user has already printed a coupon from client 120. Coupon distribution server 110 may further be configured to deny a client permission to print the coupon based on geographic information associated with the client and/or coupon offer.

Coupon distribution server 110 may use distribution logs for sending distribution reports to coupon providers 195. The form of a report may vary, and may include at least data indicating either a total number of coupons that have been distributed for a particular campaign or a total number of coupons that have been distributed for the particular campaign since the last report. Reports may be sent at varying frequencies, and in some embodiments a report may be sent each time a particular coupon is printed. Reports may further include information harvested from device data, such as geographic information or client types of the devices to which coupons have been distributed.

18.3. Client

In an embodiment, client 120 is a computing device configured to execute one or more software applications that provide user 135 with an interface to coupon distribution server 110. Client 120 may be any of a variety of devices, including a personal computer, printer, phone, scanner, camera, or portable computing device. The one or more applications executed by client 120 for interfacing with coupon distribution server 120 may include, for example, a standalone software application or a web browser. Client 120 need not necessarily be executed by a device that is owned or even exclusively operated by user 135. For example, client 120 may be executed by an in-store kiosk provided to customers by retailer 145.

Client 120 communicates with coupon distribution server 110 over a network such as the Internet to receive coupon data, such as a listing of information about coupons available to user 135, including offer terms and values, as well as data describing a specific coupon offer in sufficient detail to allow client 120 to print a coupon for the coupon offer at an optionally connected printer 129. Printer 129 is any printing device capable of printing a coupon. Printer 129 may be connected to client 120 via any communication mechanism, or client 120 may be integrated into printer 129.

Client 120 may, using various input or output mechanisms, allow user 135 to view a list of available coupon offers, select a particular coupon offer from that list, and choose whether to print a coupon for the offer, or to save the offer to user 135's account. In response to user 135 selecting the latter option, client 120 may send a request to coupon distribution server 110 to save the selected offer to user 135's account, as stored in user account data 114. Client 120 may further allow a user to obtain a coupon using any of the techniques described herein.

Client 120 communication with coupon distribution server 110 need not be continuous, and may be initiated on either a client-call or server-call basis as needed and/or whenever client 120 is connected to the same network as coupon distribution server 110. For example, client 120 may wait to request a coupon for an identifier scanned by client 120 until a next synchronization cycle, or until client 120 is next within the reception range of a cellular network.

In an embodiment, multiple clients 120 may be available to a user, with each client 120 potentially supporting different mechanisms by which the user may detect an identifier or access a coupon offer. For example, one client 120 may only allow a user to print coupons via printer 129, but not support identifier detection; another client 120 may only allow a user to save coupon offers to an account, but support identifier detection; and another client 120 may allow all of the above functionality. Each client 120 may be tied to the user's account, thus allowing a user to obtain a coupon using one client 120, but print or redeem the coupon using another client 120.

In an embodiment, some coupon data may be sent to client 120 from a server at an external website, such as a retail website, instead of coupon distribution server 110. In such an embodiment, coupon requests may or may not be relayed through such an external website.

18.4. Information Server

Client 120 may optionally communicate with an information server 160 to perform one or more preliminary activities prior to coupon distribution server 110 distributing a coupon. The information server 160 may present information to the user, such as advertisements in video or other form, or collect information from the user via, for instance, an online form. The information server 160 may determine which information to present or collect based on data provided by the client 120 or the coupon distribution server 110. The information server 160 may further report completion of an activity to the client 120 or a coupon distribution server 110.

Identifier 150 may direct client 120 to contact information server 160 prior to requesting an coupon from coupon distribution server, or the client 120 may be configured with logic to, prior to requesting a coupon for an offer selected at the device, determine whether client 120 should first contact information server 160. In an embodiment, the coupon distribution server 110 may instead instruct the client 120 to contact the information server 160 in response to the coupon distribution server 110 receiving a request to distribute a coupon. In an embodiment, no information server 160 is involved, or the information server 160 may be integrated into the coupon distribution server 110.

18.5. Retailer

Retailer 145 is any entity that conducts transactions in which users, such as user 135, may redeem coupon offers at one of retailer's point-of-sale by providing an identifier, such as identifier 132. Retailer 145's point-of-sale(s) may be, for example, brick-and-mortar store(s) or online website(s).

Coupon distribution server 110 sends coupon availability data for various account identifiers to retailer 145. For example, coupon distribution server 110 may periodically provide retailer 145 with a table of account identifiers and newly associated or disassociated coupon offers. Retailer 145 may then update an internal database based on the coupon availability data. Coupon distribution server 110 does not necessarily share its entire user account data 114 with retailer 145. In fact, retailer 145 may be oblivious to the concept of a user account, storing only identifiers and associated offers. Moreover, coupon distribution server 110 may only share data for certain types of identifiers with retailer 145. For instance, coupon distribution server 110 may only share data pertaining to identifiers that retailer 145 has indicated a willingness to accept (e.g. the retailer's own loyalty cards, or loyalty cards belonging to users who have been accepted into the retailer's coupon program).

Retailer 145 periodically, or in response to a transaction, reports coupon usage data to coupon distribution server 110. Coupon usage data indicates the redemption of one or more coupon offers, account identifiers associated with the redemptions, locations at which redemption occurred, and so forth.

Account identification 132 may be a series of characters and/or symbols that uniquely identifies user 135 or a user account associated with user 135. For example, account identification 132 may identify a retailer's loyalty account, a user account with coupon distributor 115, or both. In the latter case, for instance, account identification 132 may have been created to identify the retailer's loyalty account, but then subsequently registered with the coupon distributor account, along with potentially other identifiers. Account identification 132 may or may not also identify or be identified from a physical item, such as a card or personal computing device. In an embodiment, the physical item is any portable item that has an account identifier that can be readily accessed during a transaction.

In an embodiment, account identification 132 is a number on a card, such as a credit card or customer loyalty card. User 135 may provide identifier 132 during a transaction by, for example, scanning the card at a card reader, typing or stating the numbers on the card, or providing personal information by which the card number may be located, such as a telephone number.

In an embodiment, account identification 132 is a unique device identifier belonging to a mobile phone, tablet computer, personal digital assistant, flash drive, music player, camera, or other portable computing device. For example, the device identifier may be a MAC address, Bluetooth address, serial number, randomly assigned unique number, and so forth. User 135 may provide identification 132 during a transaction by, for example, allowing the portable device to broadcast identification 132 wirelessly to the retailer's checkout system, allowing the retailer to scan the device, or allowing the retailer to see or scan information displayed by the device. In an embodiment, identification 132 does not necessarily correspond to device hardware, but may rather be provided by a software application executing on the device.

In an embodiment, account identification 132 is emitted wirelessly by a radio-frequency identifying (RFID) chip or any other mechanism capable of transmitting signals that may be detected during a transaction with retailer 145. For example, the RFID chip may be embedded within a card, device, or other item carried by user 135.

In an embodiment, coupon distributor 115 allows user 135 to print account identification 132, or a barcode representation thereof, on a sheet of paper. The paper may then be presented to the retailer 145 during a transaction. Using this approach, user 135 can take advantage of the techniques described herein without having to remember account identification 132 and without having to present to the retailer 145 an identifying card or device. The paper may or may not be reusable in different transactions at the same or at a different retailer.

In an embodiment, account identification 132 may be associated with biometric data that uniquely identifies user 135, such as a fingerprint or a retinal scan. Thus, the user may provide the identifier in an embodiment by allowing a retailer to scan user 135 for the biometric data.

18.6. Variations and Alternatives

System 100 as shown in FIG. 1 presents only one embodiment in which the techniques described herein may be practiced. Other embodiments may include additional and/or fewer elements, in potentially different arrangements. For example, client 120 communications with coupon distribution server 110 may not be required in instances where the client 120 is capable of generating a coupon based on identifier 150 by itself, and in some embodiments coupon distribution server 110 may not be necessary at all. As another example, any of coupon provider 195, information server 160, coupon distributor 115, or retailer 145 may be the same entity, and various other components may therefore be omitted. Moreover, printer 129 is not necessary to practice many of the techniques described herein.

19.0. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
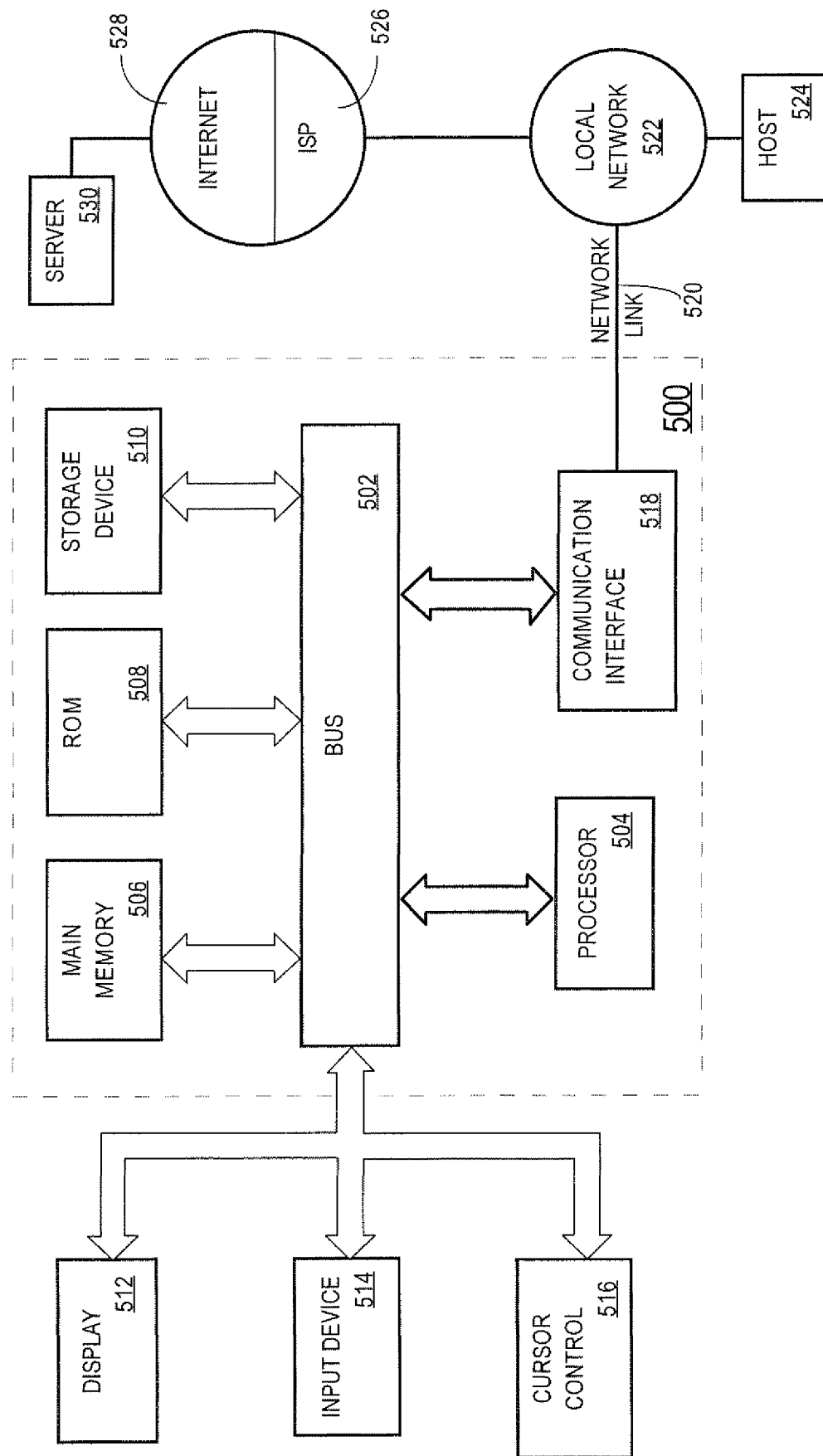
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable storage media storing one or more instructions that, when executed by one or more computing devices of an access point, cause:
    wirelessly detecting, at the access point, a portable identifier received from a portable computing device upon the portable computing device coming within a communications range of the access point, the portable identifier comprising one or more of: a passive NFC tag, an active NFC identifier transmitted by a portable computing device, or a Bluetooth MAC identifier;
    customizing, by the access point, a prerequisite activity based on the portable identifier;
    sending, by the access point, instructions to the portable computing device to present information associated with the customized prerequisite activity;
    receiving input from the portable computing device at the access point;
    sending, by the access point, the portable identifier to the portable computing device;
    sending, by the access point, to a coupon server, one or more offer selection criteria selected based on the portable identifier, the one or more offer selection criteria comprising information input by a user during the prerequisite activity and the portable identifier, wherein the portable identifier includes location detected from the one or more of: a passive NFC tag, an active NFC identifier transmitted by a portable computing device, a Bluetooth MAC identifier, and a location sensor, the coupon server having received the portable identifier from the portable computing device;
    the coupon server selecting a coupon offer and sending electronic data representing a coupon that is associated with the selected coupon to the portable computing device.

2. The one or more non-transitory computer-readable storage media of claim 1, wherein the prerequisite activity is customized for the user based at least in part on a previous interaction with the access point, purchase history, or preference data of the user.

3. The one or more non-transitory computer-readable storage media of claim 2, wherein the one or more offer selection criteria comprise one or more of: one or more offer identifiers that were randomly selected by the access point or an access point identifier.

4. The one or more non-transitory computer-readable storage media of claim 1, wherein the electronic data representing the coupon causes a coupon application executing at the portable computing device to display information about the coupon on the portable computing device.

5. The one or more non-transitory computer-readable storage media of claim 1, wherein the one or more instructions, when executed by the one or more computing devices, cause:
    at the coupon server, adding the coupon for a consumer product to one or more store loyalty accounts associated with the user.

6. A method, comprising:
    wirelessly detecting, at the access point, a portable identifier received from a portable computing device upon the portable computing device coming within a communications range of the access point, the portable identifier comprising one or more of: a passive NFC tag, an active NFC identifier transmitted by a portable computing device, or a Bluetooth MAC identifier;
    customizing, by the access point, a prerequisite activity based on the portable identifier;
    sending, by the access point, instructions to the portable computing device to present information associated with the customized prerequisite activity;
    receiving input from the portable computing device at the access point;
    sending, by the access point, the portable identifier to the portable computing device;
    sending, by the access point, to a coupon server, one or more offer selection criteria selected based on the portable identifier, the one or more offer selection criteria comprising information input by a user during the prerequisite activity and the portable identifier, wherein the portable identifier includes location detected from the one or more of: a passive NFC tag, an active NFC identifier transmitted by a portable computing device, a Bluetooth MAC identifier, and a location sensor, the coupon server having received the portable identifier from the portable computing device;
    the coupon server selecting a coupon offer and sending electronic data representing a coupon that is associated with the selected coupon to the portable computing device.

7. The method of claim 6, wherein the prerequisite activity is customized for the user based at least in part on a previous interaction with the access point, purchase history, or preference data of the user.

8. The method of claim 7, wherein the one or more offer selection criteria comprise one or more of: one or more offer identifiers that were randomly selected by the access point or an access point identifier.

9. The method of claim 6, wherein the electronic data representing the coupon causes a coupon application executing at the portable computing device to display information about the coupon on the portable computing device.

10. The method of claim 6, further comprising:
at the coupon server, adding the coupon for a consumer product to one or more store loyalty accounts associated with the user.

* * * * *